United States Patent [19]

Michielin et al.

[11] Patent Number: 4,753,371
[45] Date of Patent: Jun. 28, 1988

[54] FLOW CONTROLLED AND CONTAINER

[76] Inventors: Serge Michielin, 120, avenue des Alpes, 1814 La Tour-de-Peilz; Roland Nydegger, Sierenzerstrasse 9, 4055 Basel, both of Switzerland

[21] Appl. No.: 91,292

[22] Filed: Aug. 27, 1987

Related U.S. Application Data

[63] Continuation of Ser. No. 752,105, filed as PCT CH84/00175 on Nov. 2, 1984, published as WO85/02000 on May 9, 1985.

[30] Foreign Application Priority Data

Nov. 2, 1983 [CH] Switzerland ............ 5906/83

[51] Int. Cl.[4] .............. F16C 55/14; F16K 7/06; B65D 47/22
[52] U.S. Cl. .................. 222/144.5; 222/94; 222/145; 222/466; 222/482; 222/513; 222/528; 222/465.1; 138/119; 138/DIG. 5; 138/DIG. 8; 251/4; 604/34; 604/250
[58] Field of Search ............ 222/513, 527, 528, 530, 222/144.5, 145; 138/119, DIG.5, DIG. 8; 251/4; 604/34, 250

[56] References Cited

U.S. PATENT DOCUMENTS

| 815,192 | 3/1906 | Mercer | 251/4 X |
|---|---|---|---|
| 2,002,835 | 5/1935 | Rose | 251/4 X |
| 2,716,013 | 8/1955 | Tinker | 251/4 |
| 2,985,341 | 5/1961 | Howell | 251/4 X |
| 2,995,334 | 8/1961 | Henderson et al. | 251/4 |
| 3,190,497 | 6/1965 | Anthon | 604/250 X |
| 3,638,834 | 2/1972 | Goodrich et al. | 222/530 X |
| 4,063,706 | 12/1977 | Osborne | 251/4 |
| 4,354,660 | 10/1982 | Stupar et al. | 251/4 |
| 4,446,994 | 5/1984 | Smith | 222/528 X |
| 4,453,653 | 6/1984 | Chapelsky et al. | 222/528 |

FOREIGN PATENT DOCUMENTS

| 1069913 | 2/1954 | France . | |
| 1166745 | 6/1958 | France . | |
| 578202 | 6/1958 | Italy | 251/4 |
| 24326 | of 1900 | United Kingdom | 251/4 |
| 939324 | 10/1963 | United Kingdom | 251/4 |

Primary Examiner—Joseph J. Rolla
Assistant Examiner—Frederick R. Handren
Attorney, Agent, or Firm—Parkhurst & Oliff

[57] ABSTRACT

S-shaped opening and closing element for controlling the flow of a fluid or body (powder, granulate) and adaptable to any form of package or fitting containing fluids, characterized in that its shape in two S-bends permits both an instantaneous stoppage of the flow of the fluids and an instantaneous flow of said fluids; this, as a function of the given position, by manual or mechanical traction on the element. The S-shape ensures very effective fluid-tightness, without supplementary elements. The opening and closing element can be employed for controlling flow from a container having a supporting device for the element. The container can have more than one compartment.

9 Claims, 5 Drawing Sheets

U.S. Patent   Jun. 28, 1988   Sheet 1 of 5   4,753,371
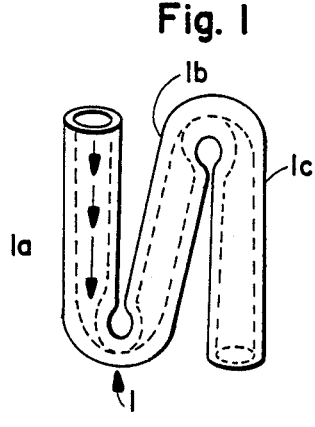
Fig. 1
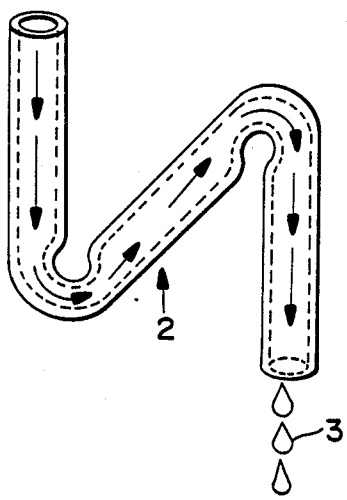
Fig. 1A
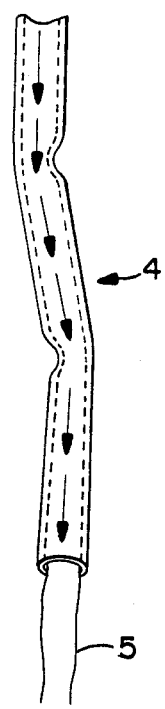
Fig. 1B
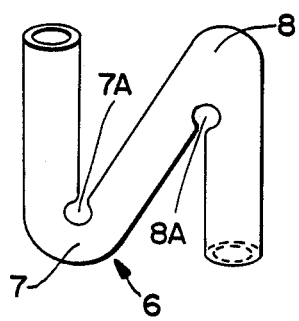
Fig. 2
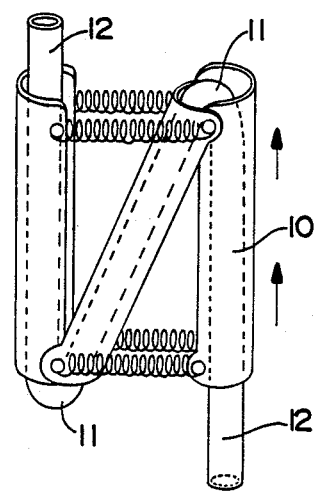
Fig. 2B
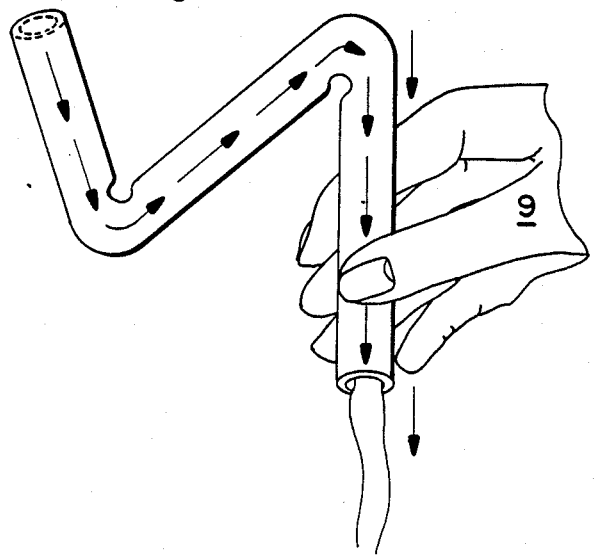
Fig. 2A
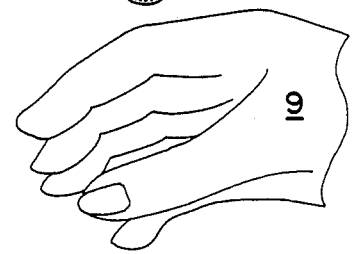

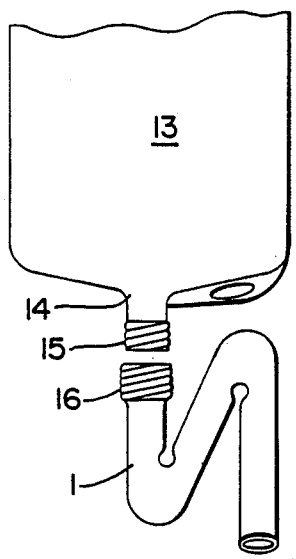
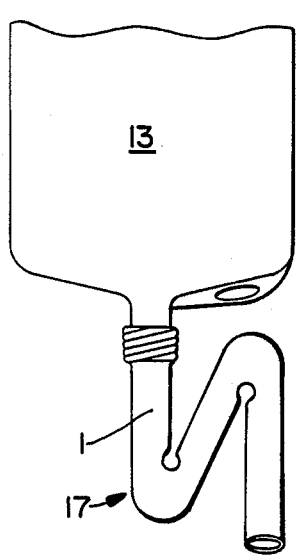
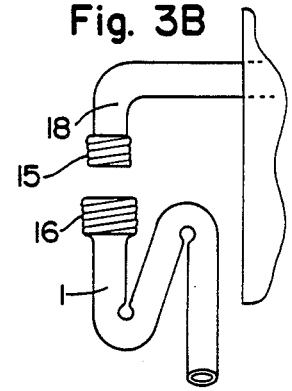
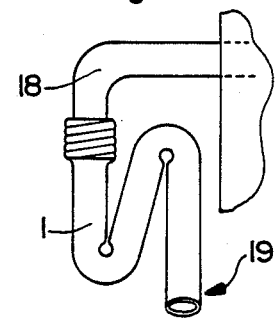
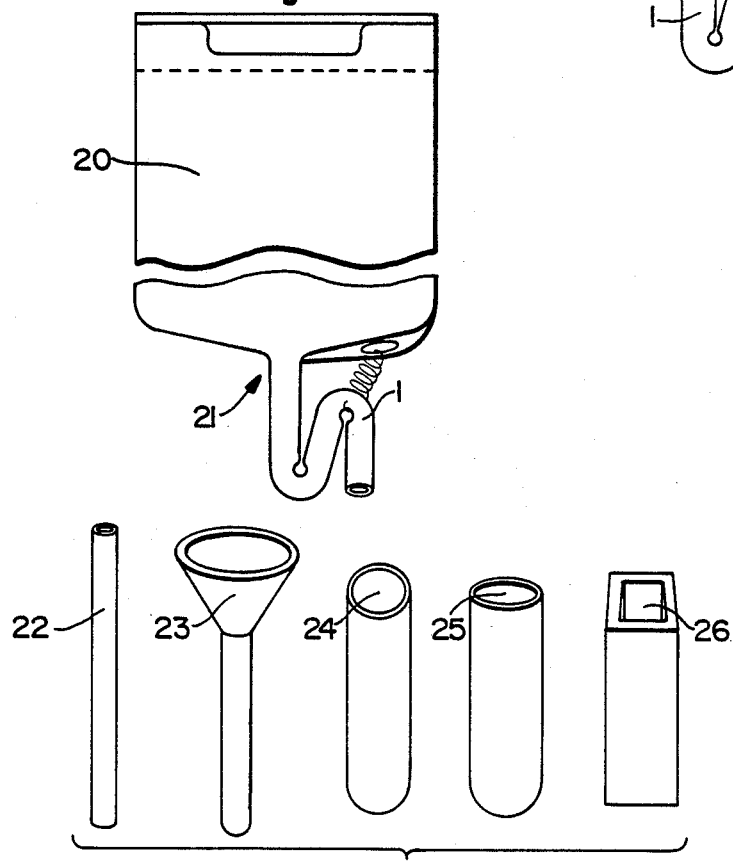

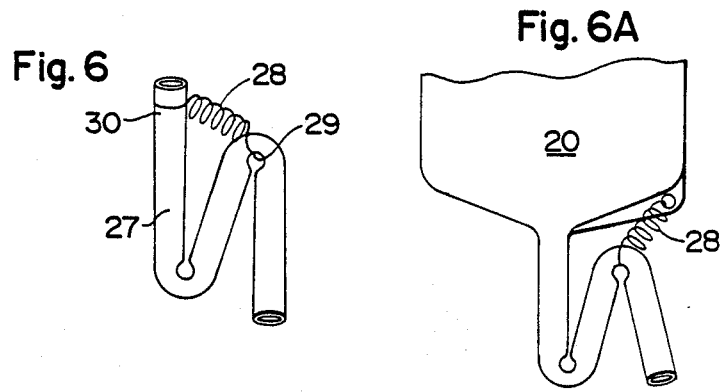
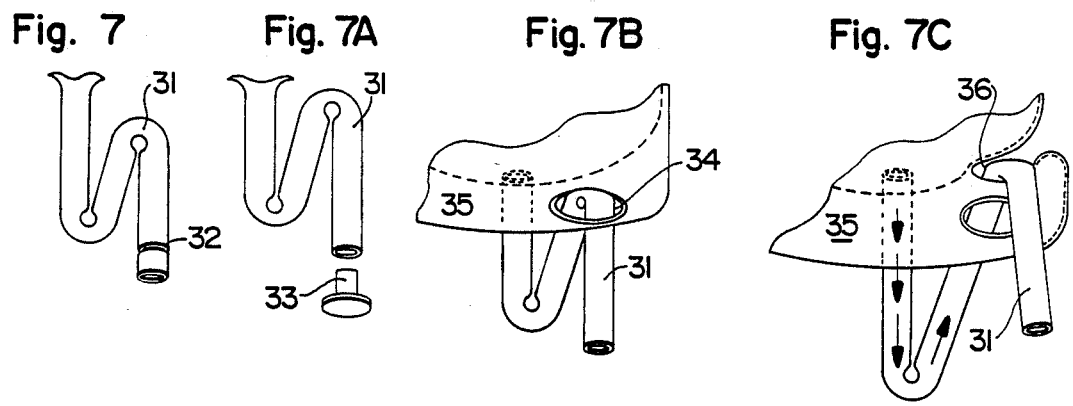
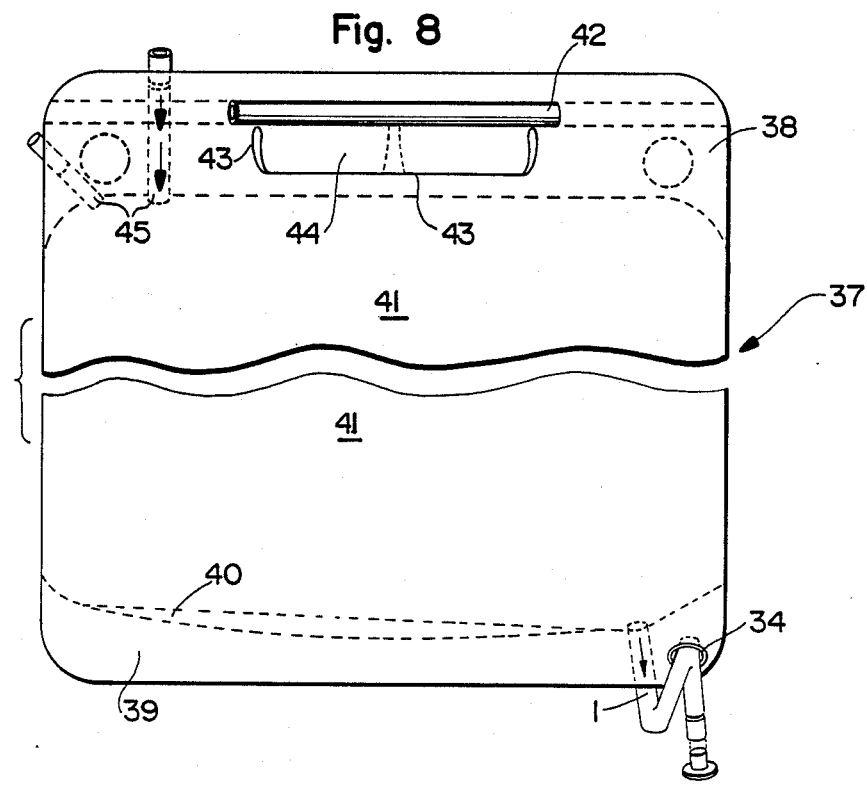

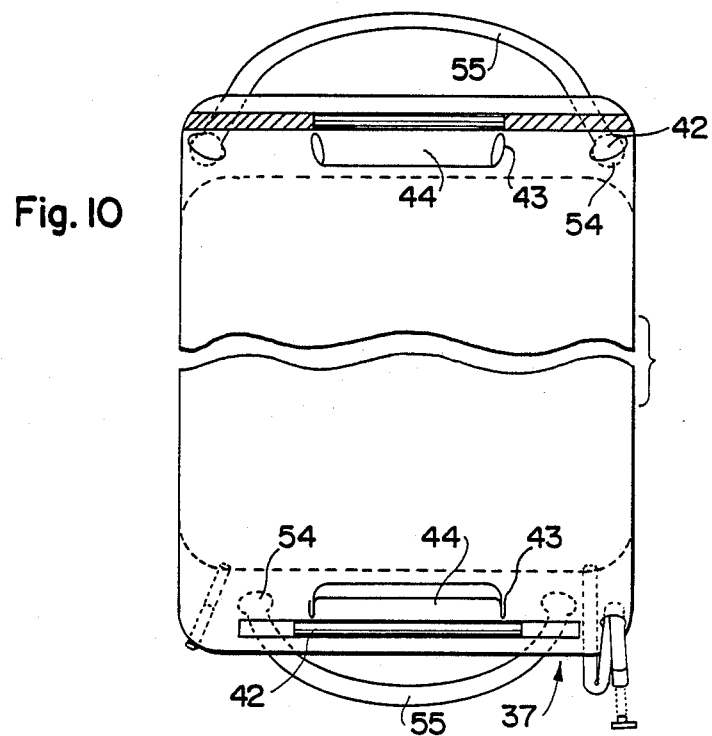
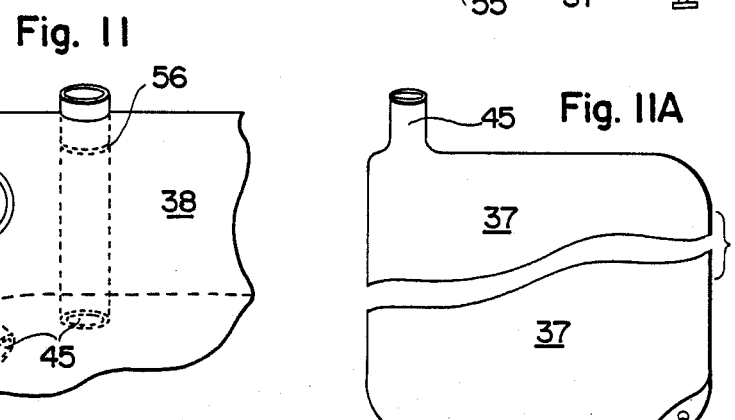
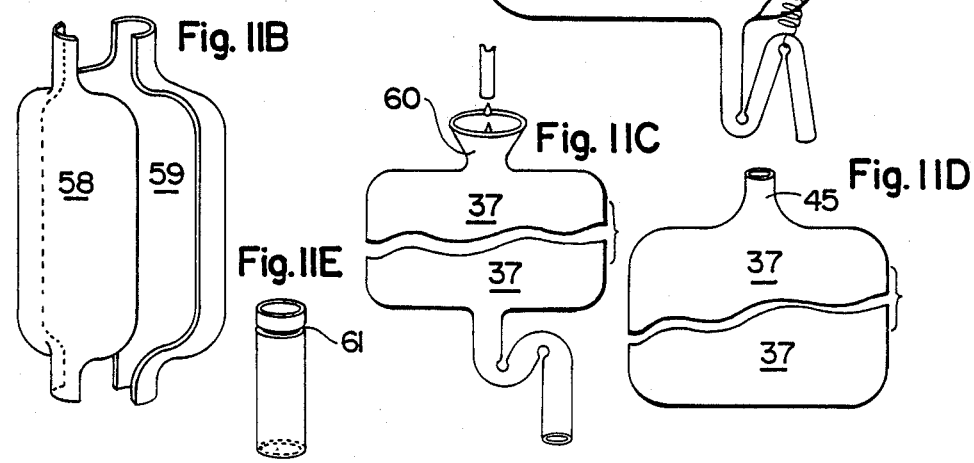

A continuation of application Ser. No. 752,105 filed as PCT CH/84/00175 on Nov. 2, 1984, published as WO85/02000 on May 9, 1985, now abandoned.

FLOW CONTROLLED AND CONTAINER

BACKGROUND OF THE INVENTION

The present invention concerns an opening and closing element for controlling the flow of any fluid or body contained in a package or in a fitting, such as those used at the present time.

SUMMARY OF THE INVENTION

The present invention has as an object to contribute an industrial innovation, the innovation being associated with its shape. The S-shaped opening and closing element permits an instantaneous flow as well as an instantaneous stoppage of said flow solely by its single S-shaped element, without having to resort to a complicated mechanism and without having to use stoppers, screw-threads, etc., as is the case in the systems used at the present time.

BRIEF DESCRIPTION OF THE DRAWINGS

FIGS. 1, 1A and 1B show perspective views of an opening and closing element in various positions.

FIGS. 2, 2A and 2B show perspective views of an opening and closing element in various embodiments.

FIGS. 3, 3A, and 3B and 3C show perspective views of an opening and closing element attached to containers in various embodiments.

FIG. 4 shows a perspective view of an opening and closing element in another embodiment.

FIG. 5 shows a perspective view of various embodiments of an opening and closing element.

FIGS. 6 and 6A show perspective views of an opening and closing element in other embodiments.

FIGS. 7, 7A, 7B and 7C show perspective views of additional embodiments of an opening and closing element.

FIG. 8 shows a perspective view of a container with an opening and closing element attached thereto.

FIG. 10 shows a perspective view of an embodiment of an opening and closing element.

FIGS. 11, 11A, 11B, 11C, 11D and 11E show perspective views of various embodiments of an opening and closing element.

DETAILED DESCRIPTION OF THE INVENTION

Figure 9:
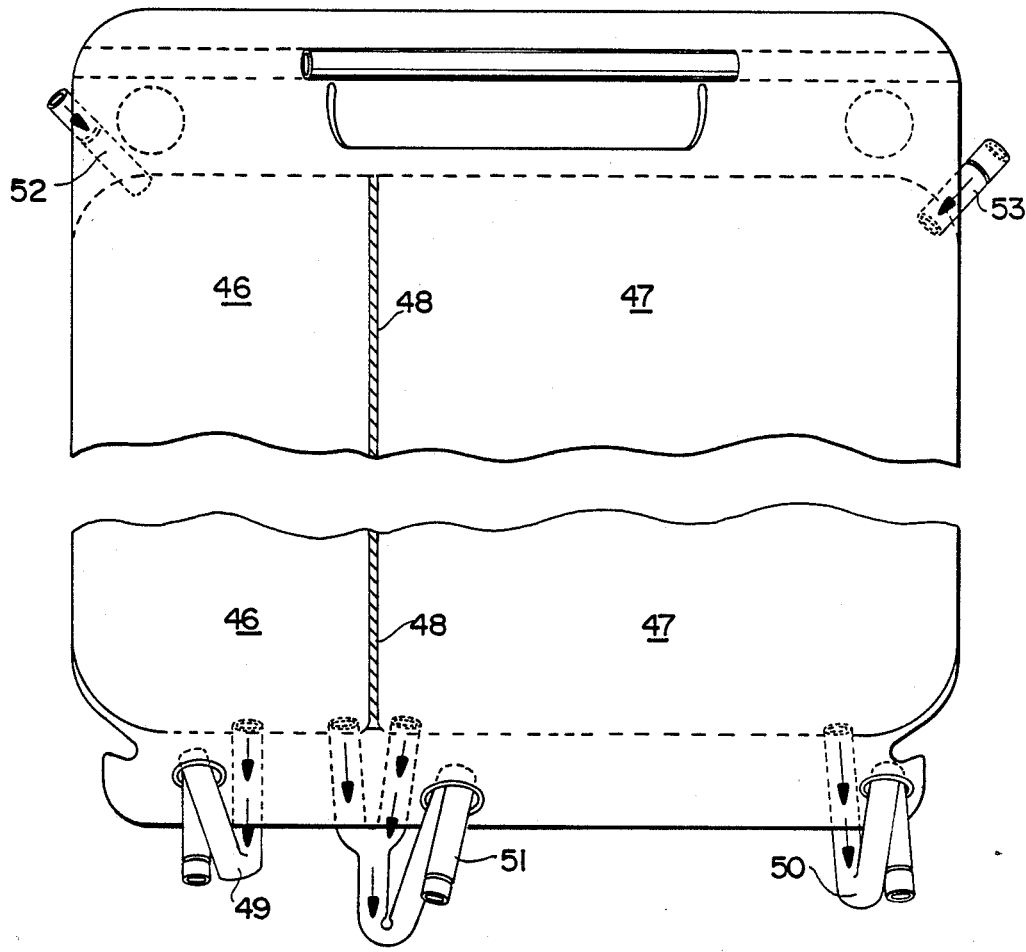
FIGS. 9 and 9A show perspective views of various embodiments of an opening and closing element.

The present invention has in its favor its novelty, insofar that in its field there is nothing like it on the market and that it can render signal services for both the opening and the closing of flow from packages containing all types of products, including alimentary products; it is to be noted that for highly volatile, dispersable, or corrosive products, the system permits handling which reduces almost totally the dispersion of said products in the air.

The present invention has in its favor its novelty, insofar that it can be constructed, for certain packages, directly in the mass of the container itself and that to associate a safety stopper with it is not of prime importance.

By the use of the term "opening and closing element," we understand it to mean a spigot system stripped of all the complications generally present in the conventional systems.

Because of its minimal cost, it brings the user an enormous simplification of use and handling, as well as a definite saving in cost during mass production.

The present invention may be manufactured independently of or directly on the container intended to receive it; to better define its different aspects, we shall now enumerate in detail the various figures of the accompanying drawings and illustrate a use in terms of a recipient-waterskin, which likewise has in its favor, in its entirety as presented, its novelty, insofar that there is nothing like it on the market and that it simplifies the conditioning, the transportation, the multiple handling and the withdrawal of fluid as compared with the traditional containers.

DETAILED DESCRIPTION OF THE DRAWINGS

In FIG. 1, the opening and closing element for controlling the flow of a fluid is presented closed 1 in S-shape, in which position it remains if there is not any sort of outer traction; in FIG. 1A semi-open 2, whereas a fluid runs slowly, possibly drop by drop 3; completely open 4 in FIG. 1B, wherein any fluid runs at a rapid rate of flow 5. Evident from FIG. 1, element 1 has an annular inner passageway which becomes restricted when element 1 is in the closed S-shape position. As a consequence the flow of fluids ceases to pass through the passageway.

The tubing comprises an end section wherein the end section has an upstream segment 1(a), an intermediate segment 1(b) and a downstream segment 1(c).

In FIG. 2, the opening and closing element for controlling the flow of a fluid is presented bent 6 with its two bends 7 and 8 and possible locations of weld spots 7A and 8A for retaining the element in its S shape, according to the materials used.

In FIG. 2A, the hand 9 exerts traction downward to ensure the flow of the fluid.

In FIG. 2B, the hand 9 releases the element which, in this case, closes automatically under the influence of the mechanical device 10 which creates the bending 11, thus ensuring the instantaneous stoppage of the flow of the fluid passing through the tube 12 which, in this case, does not necessarily have to be bent. The mechanical device 10 comprises three successive channel-shaped rigid parts and two joints connecting an intermediate one of the parts. The tubing segments 1(a), 1(b) and 1(c) are held in the corresponding channel-shaped rigid parts. A spring means connecting the joints to opposite parts maintains the tubing section in a closed position.

In FIG. 3, there is a fluid container 13 having at its opening 14, for example, a screw thread 15. Element 1 of our invention which likewise has a screw thread 16 which may be fixed on the container 13 in order to form the assembly 17, shown in FIG. 3A, composed of the part 13 and element 1; any other known method of fixation being likewise usable. FIG. 3B also illustrates a fixed and/or movable "fountain" fitting 18 capable of accepting element 1 in the same manner described above to form the assembly 19, as shown in FIG. 3C.

In FIG. 4, the opening and closing element for controlling the flow of a fluid 1 happens to be constructed in the mass of the container 20 itself, this at the time of the manufacture of said container, and thus yields the container 21 which comprises its own drain spigot.

In FIG. 5, the opening and closing element for controlling the flow of a fluid 1 may be straight 22, wide-mouthed 23, round 24, oval 25, or square 26, etc., this as a function of the fluids having to pass through said element; the length may be variable as a function of the use.

In FIG. 6, the opening and closing element for controlling the flow of a fluid 27 comprises an automatic-rise spring or elastic 28, welded or fixed to the last bend 29 (or weld spot) as well as to the mouth 30 of said element 27; said spring or elastic 28 may be likewise fixed directly to the container 20 as described in FIG. 4 above, and shown in FIG. 6A.

In FIG. 7, for reasons of handling-transportation-storage-etc., the opening and closing element for controlling the flow of a fluid 31 may have a weld 32 which may be cut at the time of use of the fluid; said element 31 may likewise have a temporary stopper 33, as shown in FIG. 7A, for the same reasons; the element 31 may likewise be inserted in a hole 34, as shown in FIG. 7B, of any shape made in the container 35; when there is repeated handling at the same place of use, the container 35 may have a notch 36, as shown in FIG. 7C, where the element 31 will be placed.

In FIG. 8, there is an example of an entirely thermoplastic container-waterskin 37, according to one possible manufacturing formula. The welded mass 38 of the top of the waterskin has a height of about five centimeters. The welded mass 39 of the bottom of the waterskin has a height of about three centimeters which may sometimes be inclined 40 as a function of the fluid contained inside. The fluid-receiving cavity 41 is a pocket which has no definite limits in its width and its height but, for purposes of example only, is about 28 centimeters in width and 40 centimeters in height. The receiving cavity 41 as shown in FIG. 8 is suitable for supporting a load of more than 60 kilos. The carrying system indicated shows the top handle 42 made of a synthetic or other material (wood, aluminum, etc.); said handle will have at the minimum a length corresponding to the width of an adult hand, and it will be embedded in the welded mass 38. A cut-out 43 in the shape of a wide-mouthed U is made in order to create a tongue 44 which serves as a protective mass when the waterskin is carried. In the present figure, we see the flow controlling element 1 of FIG. 1 held in the hole 34 as shown in the foregoing Figure 7. The adding valve 45 is likewise partially embedded in the mass 38; this valve is designed either for adding—after welding of the waterskin— materials such as nitrogen, gas, vitamins, etc., or for exhausting air with a view to creating there a vacuum effect and thus, possible, carrying out a vacuum filling.

Figure 9A:
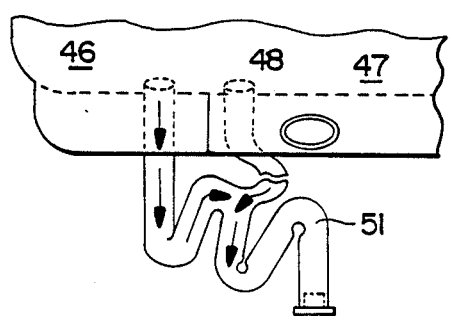

In FIG. 9, the waterskin is composed of two fluid- or body-receiving pockets 46 and 47, each containing a different fluid or body. The separation 48 is instituted by heat-welding, and its thickness may be variable as a function of the products contained in the pockets 46 and 47. The pocket 46 may have its own flow controlling opening and closing element 49, as well as the pocket 47 having its own element 50. The element 51 may replace or supplement the elements 49 and 50 as need be, as shown in FIGS. 9 and 9A, and its shape may be variable without, for all that, changing the principle of the invention of the element. The valves 52 and 53 may be welded in the waterskin, if necessary, according to the fluids contained in the pockets 46 and 47.

In FIG. 10, one may see the carrying system in its entirety. The carrying system may be at the top of the waterskin 37, as shown in FIG. 8, as well as at the bottom as indicated in the present figure; the elements indicated in FIG. 8, i.e., the handle 42, the cut-out 43, and the tongue 44, form part of it and, in addition, one notes the presence of the holes 54 and of a carrying strap 55. The carrying system is generally at the top of the waterskin; however, it may be at the bottom of the waterskin as a function of special embodiments. When there is great capacity in the waterskin, the carrying system may be at the top and at the bottom of the waterskin for lightening the load at the time of transportation and handling. The holes 54 do not serve solely for the strap 55 but are likewise provided for being fixed on a bracket.

In FIG. 11, there is illustrated the adding valve 45, as shown in FIGS. 11A and 11D, and in FIG. 8, which may be totally or partially embedded in the mass 38. The weld 56 of the valve is held in the mass 38; it may likewise be on the outside 57. This valve 45 may be the direct prolongation of the waterskin 37; a prolongation carried out at the time of an extrusion or of an assembling of two faces 58 and 59, as shown in FIG. 11B, for making up the waterskin 37. Said valve 45 has several functions; it permits filling of the waterskin in the shape presented or in a more wide-mouthed embodiment 60, as shown in FIG. 11C, according to the density of the fluid as well as the flow thereof, for example an alcohol coming out of a distiller. It likewise permits a suction-drawing after filling in order to create a vacuum effect for driving out air which may possibly remain in the waterskin. Welding will take place after the suction.

The valve 45 permits an injection of substances before filling of the waterskin, if necessary, as well as an injection of supplementary materials before use, if necessary. The valve 45 may be a simple tube 61, as shown in FIG. 11E, welded at its outer part if its function is useful only for filling. The valve may be of variable shape, as, for example, straight, round, wide-mouthed, oval, or square, etc., this as a function of the fluids contained in the recipient.

We claim:

1. A device for controlling a flow of a fluid from an outlet, comprising:

tubing having an end section and a free outlet opening, said end section further comprising an upstream segment, an intermediate segment and a downstream segment, an upstream bend and a downstream bend, said segments and said bends being made of soft material, and each said bend located respectively between two of said segments; and holding means for holding said end section in a closed position, said holding means comprising a holding mechanism for maintaining said segments in an S-shaped configuration, comprising three successive rigid channel parts, two joints joining an intermediate one of said parts with an upstream part and a downstream part respectively, and an elongation spring means connecting each one of said joints with an opposite one of said parts respectively, said upstream intermediate and downstream being held within said upstream, intermediate and downstream channel parts, respectively, said upstream bend and said downstream bend stopping the flow of fluid when said end section is in said closed position, and wherein said holding means is elastic for allowing said end section to be unfolded into a substantially straight shape thereby permitting the flow of fluid through said bends, said straight shape facilitated by the application of a pulling force on said downstream segment.

2. A device according to claim 1, wherein said elongation spring means are coil springs.

3. A container of thermoplastic material having a fluid receiving cavity, a bottom edge portion and at least one device for controlling flow of fluid from said cavity, said device consisting of a tubing in fluid communication with said fluid receiving cavity, said tubing having a continuous tubular wall of elastically deformable material and having an S-shaped end section which comprises an upstream segment, an intermediate segment, a downstream segment, an upstream bend located between said upstream and intermediate segments and a downstream bend located between said intermediate and downstream segments, said segments formed as straight tubing portions of substantially equal cross section and said bends formed as tubing portions having permanently modified cross sections such that at rest, without the imposition of external forces, said bends form acute angles thereby preventing the flow of a fluid through said end section;

wherein said bends undergo a resilient deformation upon the exertion of a pulling force on said downstream segment such that said end section is unfolded into a substantially straight shape thereby permitting the flow of fluid through said bends.

4. A container according to claim 3, wherein said bottom portion comprises a retaining means for retaining one of said bends.

5. A container according to claim 4, wherein said retaining means is an aperture provided in said bottom edge portion.

6. A container according to claim 3, wherein said fluid receiving cavity is divided into two separate pockets, said container comprising two of said tubings, one of said tubings being in fluid communication with a first pocket and the other of said tubings being in fluid communication with a second pocket.

7. A container according to claim 6 further comprising a third tubing, the upstream segment of said third tubing being in fluid communication with both said first and second pockets of said container.

8. A container according to claim 3, wherein a spring means is connected between said downstream bend and said bottom edge portion.

9. A container according to claim 8, wherein said said spring means is a single elongation spring.

* * * * *